United States Patent
Komijani et al.

(10) Patent No.: US 9,548,767 B2
(45) Date of Patent: Jan. 17, 2017

(54) MULTI-BAND AMPLIFIER

(71) Applicant: QUALCOMM Incorporated, San Diego, CA (US)

(72) Inventors: Abbas Komijani, Mountain View, CA (US); Mohammad Bagher Vahid Far, San Jose, CA (US); Amirpouya Kavousian, San Jose, CA (US); Alireza Khalili, Sunnyvale, CA (US); Yashar Rajavi, Mountain View, CA (US); Lalitkumar Nathawad, Pleasanton, CA (US); Mohammad Mahdi Ghahramani, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/532,309

(22) Filed: Nov. 4, 2014

(65) Prior Publication Data

US 2016/0126983 A1 May 5, 2016

(51) Int. Cl.
| | |
|---|---|
| H04L 27/06 | (2006.01) |
| H03F 3/191 | (2006.01) |
| H04B 1/00 | (2006.01) |
| H04B 1/16 | (2006.01) |
| H04B 5/00 | (2006.01) |

(52) U.S. Cl.
CPC .............. H04B 1/0064 (2013.01); H04B 1/16 (2013.01); H04B 5/0031 (2013.01); H04B 5/0087 (2013.01); H04B 5/0093 (2013.01)

(58) Field of Classification Search
CPC ..... H04B 5/0031; H04B 5/0037; H04B 15/00; H04B 1/385; H04B 15/02; H04B 1/40; H04B 3/36; H04B 7/0413

USPC ............................................ 375/341; 330/305
See application file for complete search history.

(56) References Cited

U.S. PATENT DOCUMENTS

| | | | | |
|---|---|---|---|---|
| 4,947,456 | A * | 8/1990 | Atkinson | H04B 1/16 455/165.1 |
| 5,347,263 | A * | 9/1994 | Carroll | G06K 7/0008 235/382 |
| 6,032,020 | A * | 2/2000 | Cook | H04B 7/2606 455/16 |
| 6,304,368 | B1 * | 10/2001 | Hansen | H01S 3/302 359/334 |
| 6,509,799 | B1 * | 1/2003 | Franca-Neto | H03F 1/223 330/305 |
| 8,068,795 | B2 | 11/2011 | Bavisi et al. | |
| 8,493,126 | B2 * | 7/2013 | Sankaranarayanan et al. | 327/355 |
| 8,514,008 | B2 | 8/2013 | Yan et al. | |
| 8,639,286 | B2 | 1/2014 | Mostafa et al. | |

(Continued)

FOREIGN PATENT DOCUMENTS

WO  WO-2014100513 A1  6/2014

*Primary Examiner* — Daniel Washburn
*Assistant Examiner* — Sarah Hassan
(74) *Attorney, Agent, or Firm* — Paradice and Li LLP

(57) ABSTRACT

A multi-band amplifier may operate in a first frequency band and a second frequency band. The multi-band amplifier may include a first amplifier, a second amplifier, and a coupler. The coupler may couple a signal, such as a communication signal, to a selected amplifier. In some embodiments, the coupler may include one or more inductive elements to couple the signal to the first or the second amplifier. In some embodiments, the inductive elements may include a balun.

19 Claims, 10 Drawing Sheets

(56) References Cited

U.S. PATENT DOCUMENTS

| | | | |
|---|---|---|---|
| 2001/0048343 A1* | 12/2001 | Islam | H01S 3/302 |
| | | | 330/4 |
| 2002/0128037 A1* | 9/2002 | Schmidt | H04M 1/725 |
| | | | 455/553.1 |
| 2006/0119426 A1* | 6/2006 | Ichitsubo | H03F 1/0233 |
| | | | 330/66 |
| 2008/0278136 A1* | 11/2008 | Murtojarvi | 323/299 |
| 2014/0159935 A1 | 6/2014 | De Graauw et al. | |

* cited by examiner ly to a multi-band amplifier.

MULTI-BAND AMPLIFIER

TECHNICAL FIELD

The present embodiments relate generally to amplifiers, and specifically to a multi-band amplifier.

BACKGROUND OF RELATED ART

A wireless device (e.g., a cellular phone or a smartphone) in a wireless communication system may transmit and receive data for two-way communication. The wireless device may include a transmitter for data transmission and a receiver for data reception. For data transmission, the transmitter may modulate a radio frequency (RF) carrier signal with data to generate a modulated RF signal, amplify the modulated RF signal to generate a transmit RF signal having the proper output power level, and transmit the transmit RF signal via an antenna to a base station. For data reception, the receiver may obtain a received RF signal via the antenna and may amplify and process the received RF signal to recover data sent by the base station.

The wireless device may include one or more amplifiers to process analog communication signals. Some wireless devices may operate within multiple frequency bands. For example, the wireless device may transmit a wireless signal within a first frequency band or within a second frequency band. Such wireless devices may include two or more amplifiers that may be optimized to transmit the wireless signal within each of the first frequency band or the second frequency band.

Coupling signals between processing stages and the amplifiers of the wireless device may provide design challenges, especially when the first frequency band is much greater (e.g., faster) than the second frequency band. For example, coupling communication signals in widely varying frequency bands may be difficult because of frequency dependent loading effects that may be associated with some signal pathways of the wireless device. These frequency dependent effects may adversely affect amplifier gain.

Thus, there is a need to effectively couple communication signals to amplifiers within multiple frequency bands to mitigate frequency dependent effects.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature and/or details are set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

In addition, the detailed description set forth below in connection with the appended drawings is intended as a description of exemplary embodiments of the present disclosure and is not intended to represent the only embodiments in which the present disclosure may be practiced. The term "exemplary" used throughout this description means "serving as an example, instance, or illustration," and should not necessarily be construed as preferred or advantageous over other embodiments.

Figure 1:
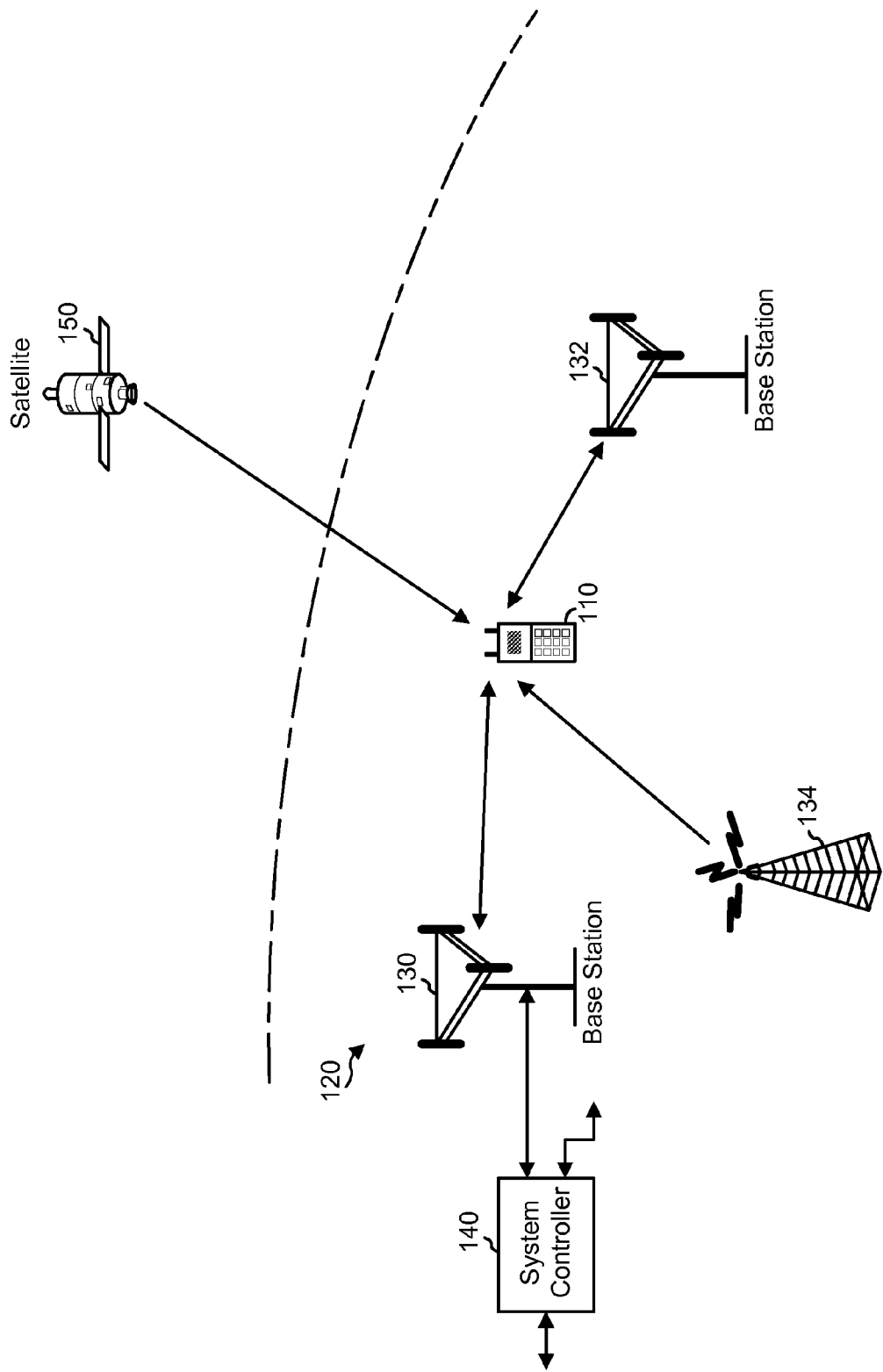
FIG. 1 shows a wireless device communicating with a wireless communication system, in accordance with some exemplary embodiments.

FIG. 1 shows a wireless device 110 communicating with a wireless communication system 120, in accordance with some exemplary embodiments. Wireless communication system 120 may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. For simplicity, FIG. 1 shows wireless communication system 120 including two base stations 130 and 132 and one system controller 140. In general, a wireless system may include any number of base stations and any set of network entities.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may communicate with wireless communication system 120. Wireless device 110 may also receive signals from broadcast stations (e.g., a broadcast station 134), signals from satellites (e.g., a satellite 150) in one or more global navigation satellite systems (GNSS), etc. Wireless device 110 may support one or more radio technologies for wireless communication such as LTE, WCDMA, CDMA 1×, EVDO, TD-SCDMA, GSM, 802.11, etc.

Figure 2:
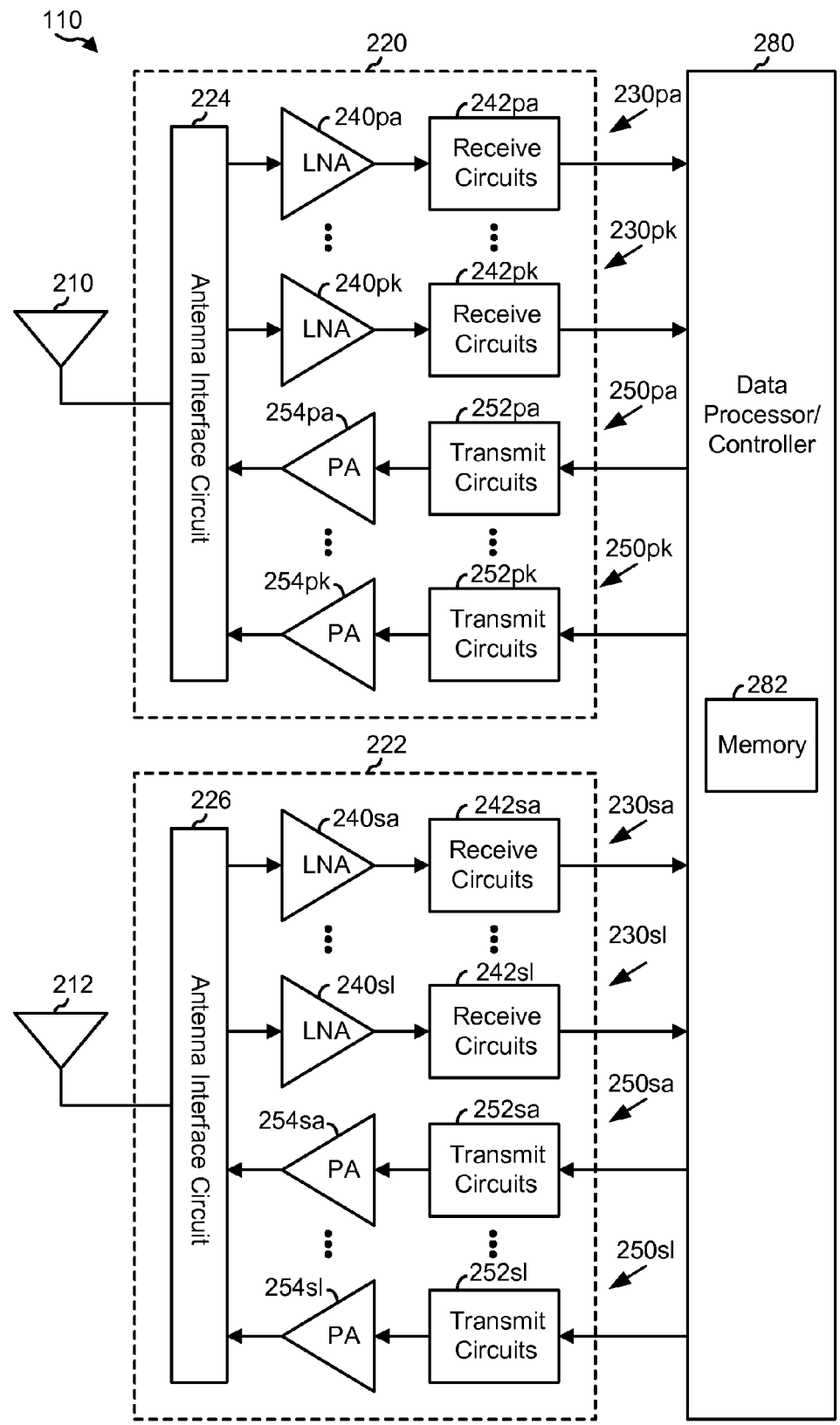
FIG. 2 shows an exemplary design of a receiver and a transmitter of FIG. 1.

FIG. 2 shows a block diagram of an exemplary design of wireless device 110 in FIG. 1. In this exemplary design, wireless device 110 includes a primary transceiver 220 coupled to a primary antenna 210, a secondary transceiver 222 coupled to a secondary antenna 212, and a data processor/controller 280. Primary transceiver 220 includes a number (K) of receivers 230pa to 230pk and a number (K) of transmitters 250pa to 250pk to support multiple frequency bands, multiple radio technologies, carrier aggregation, etc. Secondary transceiver 222 includes a number (L) of receivers 230sa to 230sl and a number (L) of transmitters 250sa to 250sl to support multiple frequency bands, multiple radio technologies, carrier aggregation, receive diversity, multiple-input multiple-output (MIMO) transmission from multiple transmit antennas to multiple receive antennas, etc.

In the exemplary design shown in FIG. 2, each receiver 230 includes a low noise amplifier (LNA) 240 and receive circuits 242. For data reception, primary antenna 210 receives signals from base stations and/or other transmitter stations and provides a received radio frequency (RF) signal, which is routed through an antenna interface circuit 224 and presented as an input RF signal to a selected receiver. Antenna interface circuit 224 may include switches, duplexers, transmit filters, receive filters, matching circuits, etc. The description below assumes that receiver 230pa is the selected receiver. Within receiver 230pa, an LNA 240pa amplifies the input RF signal and provides an output RF signal. Receive circuits 242pa downconvert the output RF signal from RF to baseband, amplify and filter the downconverted signal, and provide an analog input signal to data processor/controller 280. Receive circuits 242pa may include mixers, filters, amplifiers, matching circuits, an oscillator, a local oscillator (LO) generator, a phase locked loop (PLL), etc. Each remaining receiver 230 in transceivers 220 and 222 may operate in similar manner as receiver 230pa.

In the exemplary design shown in FIG. 2, each transmitter 250 includes transmit circuits 252 and a power amplifier (PA) 254. For data transmission, data processor/controller 280 processes (e.g., encodes and modulates) data to be transmitted and provides an analog output signal to a selected transmitter. The description below assumes that transmitter 250pa is the selected transmitter. Within transmitter 250pa, transmit circuits 252pa amplify, filter, and upconvert the analog output signal from baseband to RF and provide a modulated RF signal. Transmit circuits 252pa may include amplifiers, filters, mixers, matching circuits, an oscillator, an LO generator, a PLL, etc. A PA 254pa receives and amplifies the modulated RF signal and provides a transmit RF signal having the proper output power level. The transmit RF signal is routed through antenna interface circuit 224 and transmitted via primary antenna 210. Each remaining transmitter 250 in transceivers 220 and 222 may operate in similar manner as transmitter 250pa.

Each receiver 230 and transmitter 250 may also include other circuits not shown in FIG. 2, such as filters, matching circuits, etc. All or a portion of transceivers 220 and 222 may be implemented on one or more analog integrated circuits (ICs), RF ICs (RFICs), mixed-signal ICs, etc. For example, LNAs 240 and receive circuits 242 within transceivers 220 and 222 may be implemented on multiple IC chips, as described below. The circuits in transceivers 220 and 222 may also be implemented in other manners.

Data processor/controller 280 may perform various functions for wireless device 110. For example, data processor/controller 280 may perform processing for data being received via receivers 230 and data being transmitted via transmitters 250. Data processor/controller 280 may control the operation of the various circuits within transceivers 220 and 222. A memory 282 may store program codes and data for data processor/controller 280. Data processor/controller 280 may be implemented on one or more application specific integrated circuits (ASICs) and/or other ICs.

Figure 3:
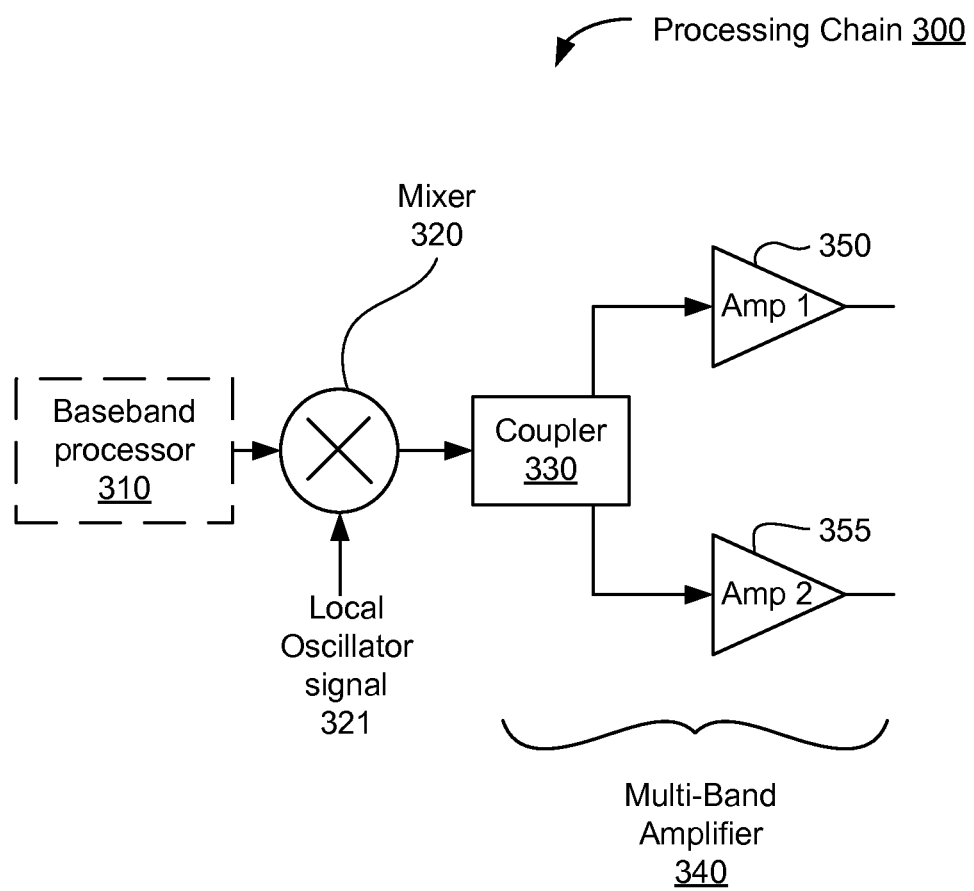
FIG. 3 is a block diagram of an exemplary processing chain.

FIG. 3 is a block diagram of an exemplary processing chain 300 of wireless device 110. In some embodiments, processing chain 300 may be a transmit chain included within transmit circuits 252, as described above. In other embodiments, processing chain 300 may be a receive chain included within receive circuits 242, as described above. Processing chain 300 may include a mixer 320 and a multi-band amplifier 340. A baseband processor 310 (shown with dashed lines in FIG. 3) may also be included in processing chain 300 when processing chain 300 is a transmit chain.

Processing chain 300 may process a communication signal within a plurality of frequency bands. For example, when wireless device 110 transmits and receives a wireless signal within both 2.4 GHz and 5 GHz frequency bands, then processing chain 300 may also process a related signal within both the 2.4 GHz and the 5 GHz frequency bands. The communication signal to be processed by processing chain 300 may be provided to mixer 320. In some embodiments, baseband processor 310 may process and/or encode the communication signal and may provide a baseband signal (e.g., an encoded communication signal) to mixer 320. Mixer 320 may "mix" (e.g., multiply together two input signals and generate an output signal based on a product of the two input signals) together a first signal and a second signal. In one embodiment, the first signal may be the baseband signal from baseband processor 310, and the second signal may be a local oscillator (LO) signal 321. In some embodiments, an output signal of mixer 320 may be an upconverted signal that may be amplified and transmitted by wireless device 110.

The output signal of mixer 320 may be a differential signal (e.g., complementary signals transmitted on two conductors) or a single-ended signal. The output signal from mixer 320 may be coupled to multi-band amplifier 340. Multi-band amplifier 340 may include a coupler 330, a first amplifier 350, and a second amplifier 355. Although only two amplifiers 350 and 355 are shown for simplicity, in other embodiments, multi-band amplifier 340 may include other numbers of amplifiers.

In some embodiments, multi-band amplifier 340 may amplify the output signal of mixer 320 for use in a first frequency band or a second frequency band. For example, if LO signal 321 coupled to mixer 320 has a frequency of $f_0$, then the first frequency band may be related to frequency $f_0$. On the other hand, if the LO signal 321 has a frequency $f_1$ that is twice $f_0$ (e.g., $f_1=2f_0$), then the second frequency band may be related to the frequency $2f_0$.

Coupler 330 may provide a configurable signal coupling between mixer 320, first amplifier 350, and second amplifier 355. First amplifier 350 and second amplifier 355 may each include differential or single-ended inputs. Thus, coupler 330 may include differential and/or single-ended outputs to couple the output signal of mixer 320 to first amplifier 350 and second amplifier 355. Operation of coupler 330 is described in more detail below, in conjunction with FIG. 4.

Figure 4:
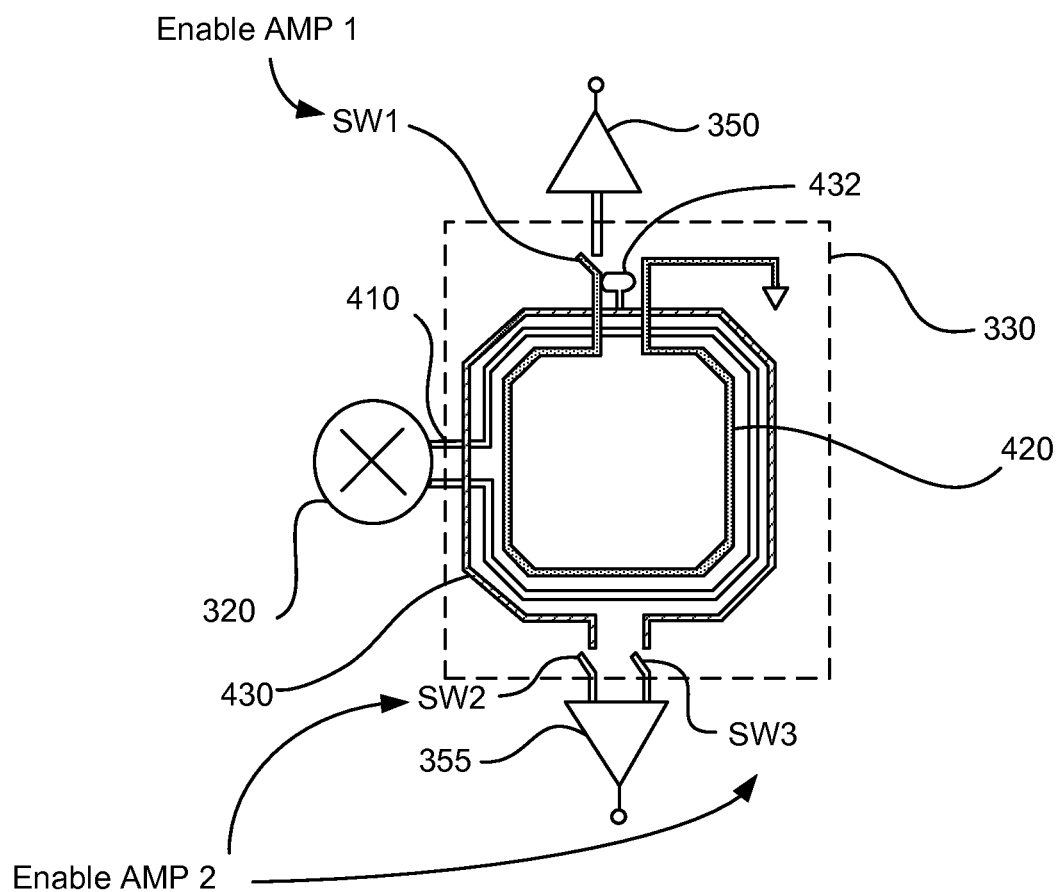
FIG. 4 is a diagram of an exemplary embodiment of the multi-band amplifier of FIG. 3.

FIG. 4 is a diagram of an exemplary embodiment of multi-band amplifier 340 of FIG. 3. Multi-band amplifier 340 may include coupler 330 (shown within dashed lines), first amplifier 350, and second amplifier 355. As described above, multi-band amplifier 340 may receive an output signal from mixer 320. In this exemplary embodiment, mixer 320 has a differential output. In other embodiments, mixer 320 may have a single-ended output.

Coupler 330 may receive output signals from mixer 320 and couple the output signals to first amplifier 350 and/or second amplifier 355. In some embodiments, coupler 330 may be an inductive coupler and may magnetically couple an input signal to one or more coupler outputs through inductive elements. Coupler 330 may include a primary element 410, a first secondary element 420, and a second secondary element 430. For simplicity, only one primary and two secondary elements are shown in FIG. 4. In other embodiments, coupler 330 may have different numbers of primary and secondary elements. Primary element 410 may be coupled to mixer 320. In some embodiments, when mixer 320 has differential outputs, primary element 410 may be differentially coupled to mixer 320. In other embodiments, when mixer 320 has a single-ended output, primary element 410 may be coupled to mixer 320 via a single conductor.

First secondary element 420 may be coupled to first amplifier 350. In some embodiments, first amplifier 350 may have a single-ended input. Thus, a first terminal of first amplifier 350 may be coupled to first secondary element 420. Second secondary element 430 may be coupled to second amplifier 355. In some embodiments, second amplifier 355 may have differential inputs (e.g., amplifier 355 may be a differential amplifier). Thus, a first terminal and a second terminal of second amplifier 355 may be coupled to second secondary element 430.

In some embodiments, the first secondary element 420 and the second secondary element 430 may be coupled via optional switches to first amplifier 350 and second amplifier 355, respectively. This may provide isolation from coupler 330 when the associated amplifier is not in use. Isolating an unused amplifier may reduce signal losses within coupler 330. In some embodiments, however, switches may introduce parasitic resistance, capacitance, and/or distortion.

In some embodiments, a switch SW1 may be controlled by an Enable AMP 1 signal. Switch SW1 may couple first amplifier 350 to first secondary element 420. In a similar manner, a switch SW2 and a switch SW3 may be controlled by an Enable AMP 2 signal. Switch SW2 and switch SW3 may couple second amplifier 355 to second secondary element 430. In some embodiments, the Enable AMP 1 signal and the Enable AMP 2 signal may also control an operating mode of and/or power supplied to the respective amplifiers. Thus, in some embodiments, the Enable AMP 1 signal and the Enable AMP 2 signal may allow first amplifier 350 and second amplifier 355, respectively, to operate in a power-saving mode or operate in a normal operating mode. Although switches SW1-SW3 are shown as simple switches in FIG. 4, in other embodiments, any technically feasible switch unit, module, or device may be used to selectively couple amplifiers to elements of coupler 330. For example, one or more transistors may be used to implement switches SW1-SW3.

In one embodiment, second secondary element 430 may include a center-tap 432. Center-tap 432 may be used to couple a portion of second secondary element 430 to a fixed voltage or a ground potential. When a fixed voltage is coupled to center-tap 432, a bias voltage may be provided to an input stage of second amplifier 355. In some embodiments, when a signal is induced within an inductive element (e.g., second secondary element 430), an electrical node on the inductive element may operate as a virtual ground. That is, although not connected to ground, a balanced nature of signals within the inductive element may provide an electrical node with no current flow that may operate as a ground node. In some embodiments, center-tap 432 may coincide with a virtual ground associated with second secondary element 430.

In one embodiment, primary element 410, first secondary element 420, and second secondary element 430 may be arranged as concentric inductors, as shown. When dimensions and/or geometries of elements 410, 420, and 430 are similar, then associated electrical characteristics of the elements may be similar as well. For example, if trace width, trace length and trace depth for first secondary element 420 are similar to those of second secondary element 430, then an inductance associated with first secondary element 420 may be similar to an inductance associated with second secondary element 430.

Figure 5:
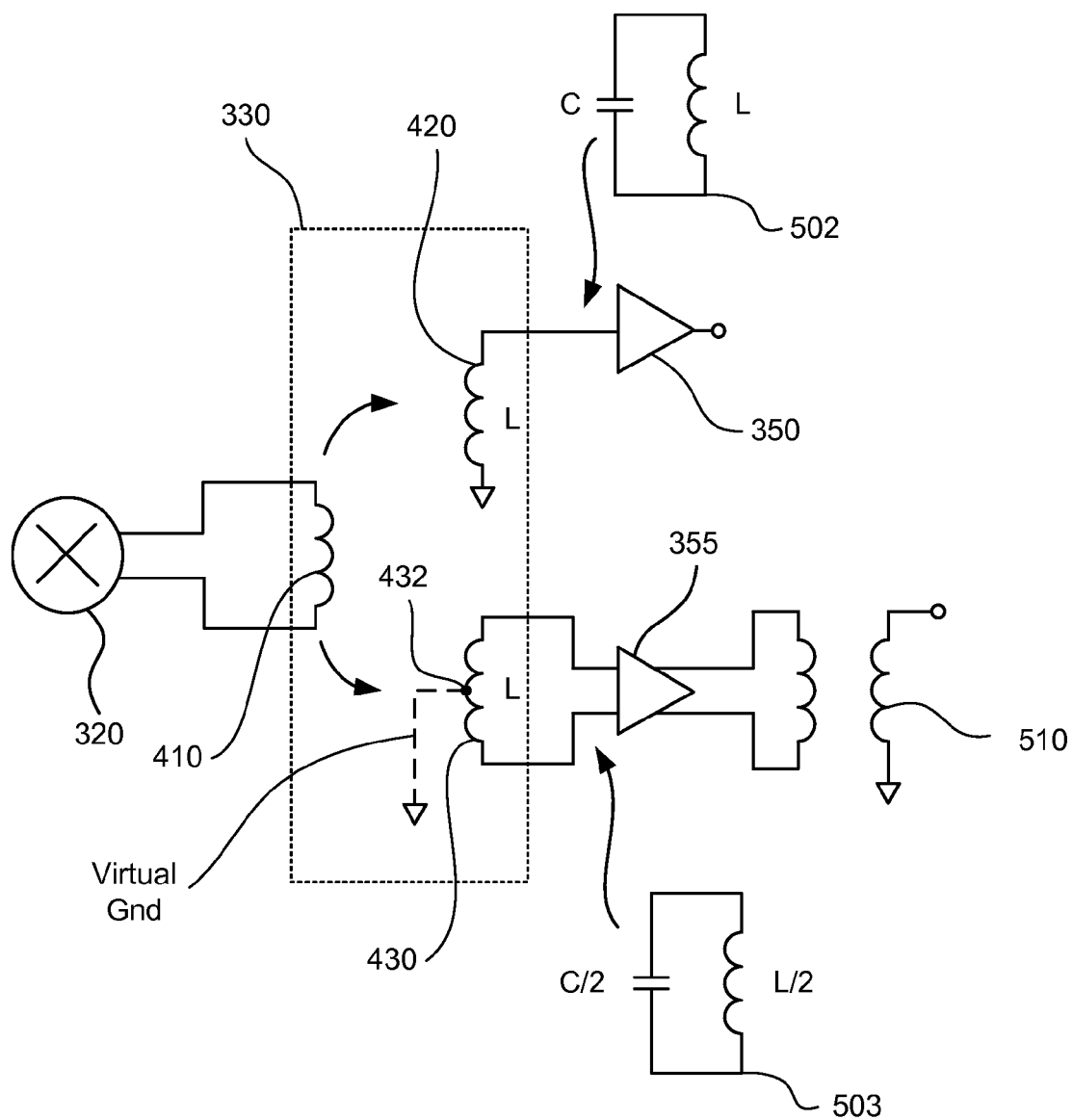
FIG. 5 is a schematic drawing of the exemplary embodiment of the multi-band amplifier and mixer of FIG. 3.

FIG. 5 is a schematic drawing of the exemplary embodiment of multi-band amplifier 340 and mixer 320 of FIG. 3. In some embodiments, the multi-band amplifier 340 may include coupler 330, first amplifier 350, and second amplifier 355. Coupler 330 may include primary element 410, first secondary element 420, and second secondary element 430. Mixer 320 may have differential outputs and may be coupled to primary element 410 as shown. Switches SW1-SW3 are not shown for simplicity.

First amplifier 350 may have a single-ended input coupled to first secondary element 420. In some embodiments, first secondary element 420 may be arranged to operate as a balun such that a first terminal of first secondary element 420 is coupled to the first terminal of first amplifier 350 and a second terminal of first secondary element 420 is coupled to ground. In some embodiments, second amplifier 355 may have differential inputs and may be coupled via two terminals to second secondary element 430. Coupler 330 may couple a signal from primary element 410 to first secondary element 420 and/or second secondary element 430 (shown by arrows within coupler 330). In some embodiments, the coupling may be a magnetic coupling between primary element 410, first secondary element 420, and second secondary element 430.

In one embodiment, primary element 410, first secondary element 420, and second secondary element 430 may be arranged as concentric inductors with similar dimensions, as described above in conjunction with FIG. 4. Thus, the inductance of first secondary element 420 and the inductance of the second secondary element 430 may have a similar value. As shown in FIG. 5, the inductance of first secondary element 420 and second secondary element 430 may be L henrys.

A reactive load, as seen from the input of first amplifier 350, may be based on an inherent capacitance C (e.g., a capacitance associated with the input of first amplifier 350) and the inductance of first secondary element 420. Thus, the reactive load for first amplifier 350 may be modeled by a first reactive load 502. As shown, first reactive load 502 includes capacitance C in parallel with inductance L. First reactive load 502 may have a resonant frequency $RF_0$ described by eq. 1, shown below:

$$RF_0 = \frac{1}{\sqrt{LC}} \quad \text{(eq. 1)}$$

The value of C may be dictated by amplifier design constraints of first amplifier 350. The value of L may be selected (by choosing dimensions of first secondary element 420) to provide a resonant frequency within a selected frequency band for first amplifier 350. Thus, $RF_0$ may be selected (by selecting L and C) to be within the first frequency band.

Second secondary element 430 is differentially coupled to second amplifier 355. In some embodiments, when a signal is induced in second secondary element 430, center-tap 432 may be a virtual ground, a small-signal ground, or another ground as described above (see FIG. 4, 432). When center-tap 432 is a ground, virtual ground or a similar node, the inductance of second secondary element 430 may be reduced in half to L/2. Furthermore, since second amplifier 355 has two differential inputs (in contrast to the single-ended input of first amplifier 350), the associated input capacitance of second amplifier 355 is also reduced in half to C/2. A second reactive load 503 depicts a reactive load as seen by one of the inputs of second amplifier 355. Second reactive load 503 includes capacitance C/2 in parallel with inductance L/2. As a result, second reactive load 503 may have a resonant frequency $RF_1$ described by eq. 2, shown below:

$$RF_1 = \frac{1}{\sqrt{\left(\frac{L}{2}\right)\left(\frac{C}{2}\right)}} = \frac{2}{\sqrt{LC}} = 2RF_0 \quad \text{(eq. 2)}$$

Thus, when the inductance of first secondary element 420 is approximately the same as the inductance of second secondary element 430, and the input capacitance associated with first amplifier 350 is approximately the same as the input capacitance (e.g., a total input capacitance) associated with second amplifier 355, the second resonant frequency $RF_1$ may be approximately twice the first resonant frequency $RF_0$. Accordingly, coupler 330 may provide a first coupling interface for a first frequency, and a second coupling interface for a second frequency that is approximately twice the first frequency. In some embodiments, the resonant frequency $RF_1$ may be less than twice the resonant frequency $RF_0$ due to imperfect coupling, capacitive, inductive, and/or resistive loading of a previous stage, or any other physical circuit effects. Design of first secondary element 420 and/or second secondary element 430 may avoid the use of additional tuning capacitors often needed to "tune" coupler 330 for selected frequency bands. For example, if first amplifier 350 is to amplify wireless signals within a 2.4 GHz frequency band (e.g., $RF_0$=2.4 GHz), an L inductance value for first secondary element 420 may be selected for first reactive load 502 to have a first resonant frequency near 2.4 GHz. A similar inductance value L for second secondary element 430 would provide a second resonant frequency of approximately 4.8 GHz ($2RF_0$=$RF_1$=2(2.4 GHz)=4.8 GHz).

In some embodiments, an output of second amplifier 355 may be coupled through a balun 510. Thus, although second amplifier 355 may have differential outputs, balun 510 may convert the output of amplifier 355 to a single-ended output, similar to first amplifier 350.

Figure 6:
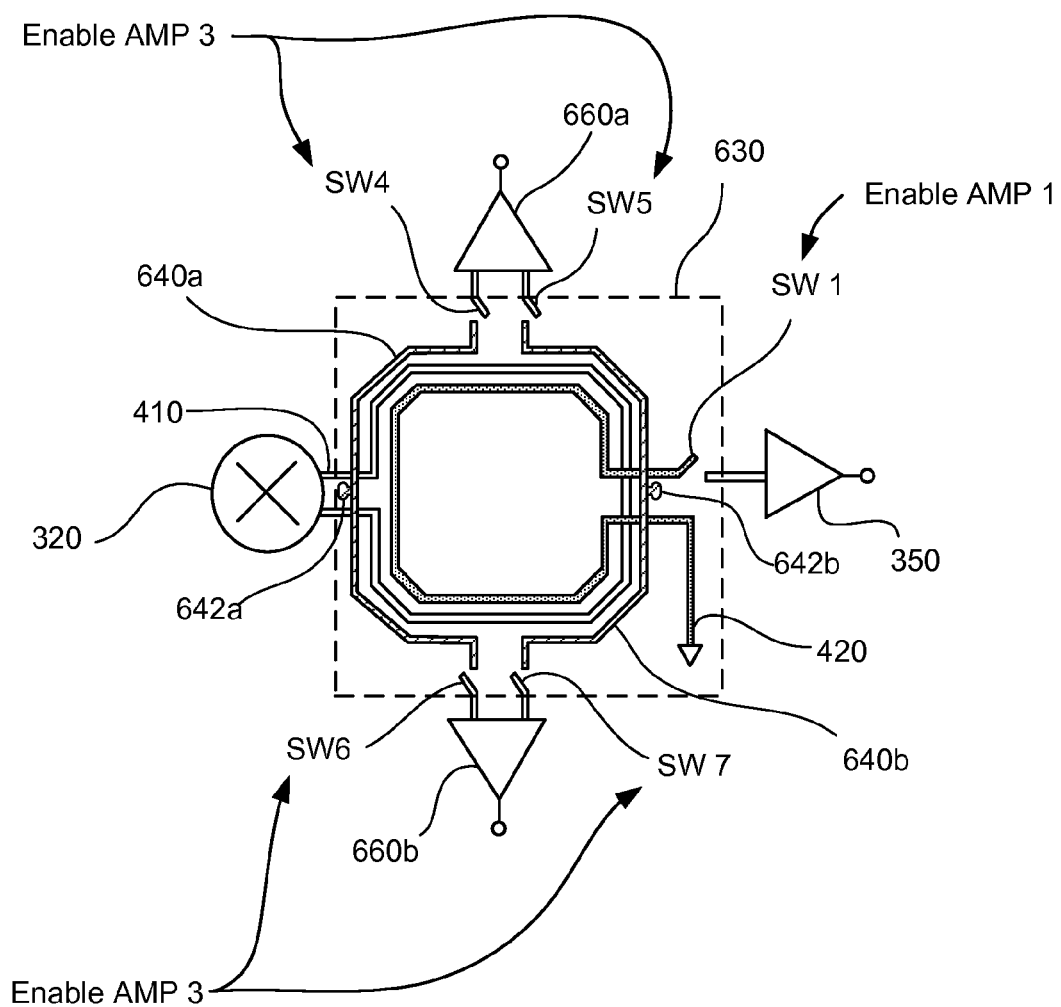
FIG. 6 is a diagram of another exemplary embodiment of the multi-band amplifier of FIG. 3.

FIG. 6 is a diagram of another exemplary embodiment of multi-band amplifier 340. Multi-band amplifier 340 may include first amplifier 350, a coupler 630, and a third amplifier 660. In some embodiments, third amplifier 660 may include a first amplifier section 660a and a second amplifier section 660b. Output power from first amplifier section 660a may be summed with output power from second amplifier section 660b to provide a combined output power for third amplifier 660.

Coupler 630 (shown with a dashed line in FIG. 6) may include primary element 410, first secondary element 420, and a third secondary element 640. In some embodiments, third secondary element 640 may include a first sub-element 640a and a second sub-element 640b. As shown, primary element 410 may be coupled to mixer 320. First secondary element 420 may be coupled to first amplifier 350 in a manner similar to that described in conjunction with FIG. 4. Similarly, switch SW1 may couple first amplifier 350 to first secondary element 420.

First sub-element 640a and second sub-element 640b may be coupled to first amplifier section 660a and second amplifier section 660b. As shown, first amplifier section 660a may include differential inputs and may be coupled to first sub-element 640a and second sub-element 640b. In a similar manner, second amplifier section 660b may include differential inputs and may also be coupled to first sub-element 640a and second sub-element 640b.

In one embodiment, first sub-element 640a may include a center-tap 642a and second sub-element 640b may include a center tap 642b. As described above in conjunction with FIG. 4, center-taps 642a and 642b may be used to couple a portion of first sub-element 640a and second sub-element 640b respectively to a fixed voltage or a ground potential. In some embodiments, when a signal is induced within an inductive element (e.g., first sub-element 640a and second sub-element 640b), an electrical node on the inductive element may operate as a virtual ground. In some embodiments, center-taps 642a and 642b may each coincide with a virtual ground.

In some embodiments, first secondary element 420 and third secondary element 640 may be coupled via optional switches to first amplifier 350 and third amplifier 660, respectively. Coupling first secondary element 420 and third secondary element 640 through switches may allow isolation of first amplifier 350 and third amplifier 660 from coupler 630. Isolating an unused amplifier may reduce signal losses within coupler 630.

For example, switches SW4-SW7 may be controlled by an Enable AMP 3 signal. Switches SW4-SW7 may couple third amplifier 660 to third secondary element 640. Although switches SW4-SW7 are shown as simple switches in FIG. 6, in other embodiments, any technically feasible switch unit, module, or device may be used to couple amplifiers to elements of coupler 630. In some embodiments, switches SW1 and SW4-SW7 may be omitted when isolating unused amplifiers is not necessary.

In one embodiment, primary element 410, first secondary element 420, and third secondary element 640 may be arranged as concentric inductors with similar geometries (e.g., dimensions). Thus, inductance of first secondary element 420, and third secondary element 640 may have a similar value.

Figure 7:
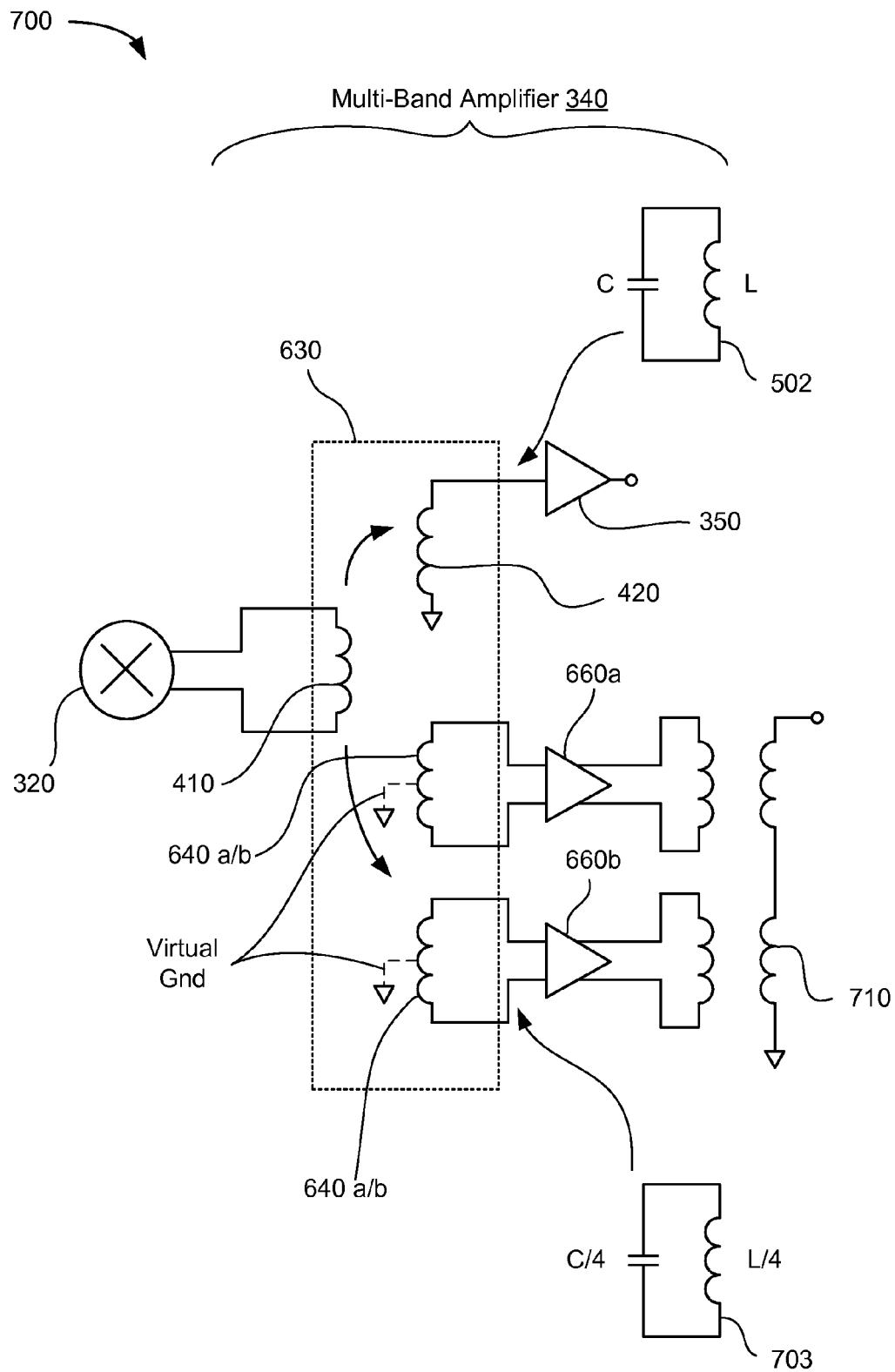
FIG. 7 is a schematic drawing of the exemplary embodiment of the multi-band amplifier and mixer of FIG. 6.

FIG. 7 is a schematic drawing 700 of the exemplary embodiment of multi-band amplifier 340 and mixer 320 of FIG. 6. In some embodiments, the multi-band amplifier 340 may include coupler 630, first amplifier 350, and third amplifier 660. Coupler 630 may include primary element 410, first secondary element 420, and third secondary element 640. Mixer 320 may have differential outputs and may be coupled to primary element 410 as shown. Switches SW1 and SW4-SW7 are not shown for simplicity. Coupler 630 may couple a signal from primary element 410 to first secondary element 420 and/or third secondary element 640 (shown by arrows within coupler 630). In some embodiments, first secondary element 420 may be arranged to operate as a balun. First reactive load 502 may have a resonant frequency $RF_0$, as described above by eq. 1.

Third secondary element 640 may be differentially coupled to third amplifier 660. For example, first amplifier section 660a may be coupled to first terminals of first sub-element 640a and second sub-element 640b. Similarly, second amplifier section 660b may be coupled to second terminals of first sub-element 640a and second sub-element 640b.

A reactive load for inputs of third amplifier 660 may be determined in a manner similar to that described above in conjunction with FIG. 5. For example, when geometries of the first secondary element 420 are similar to the third secondary element 640, the inductance of the first secondary element 420 may be similar to the inductance of the third secondary element 640. In some embodiments, when a signal is induced in first sub-element 640a, center-tap 642a may be a ground node, virtual ground, small-signal ground, or similar ground. Thus, first sub-element 640a may be divided in half near center-tap 642a. Since first sub-element 640a may have an approximate inductance of L/2 (because first sub-element 640a may have approximately one-half the physical dimensions of first secondary element 420), the ground node may divide the associated inductance in half and provide an inductance of L/4. Capacitance C associated with third amplifier 660 may be distributed across four inputs and, therefore, may be reduced to C/4. Thus, a third reactive load 703 may be modeled by a capacitor with capacitance C/4 in parallel with an inductor with inductance L/4. Third reactive load 703 may have a resonant frequency $RF_2$ described by eq. 3 below:

$$RF_2 = \frac{1}{\sqrt{\left(\frac{L}{4}\right)\left(\frac{C}{4}\right)}} = \frac{4}{\sqrt{LC}} = 4RF_0 \quad \text{(eq. 3)}$$

Thus, when geometries of first secondary element 420 are similar to the geometries of third secondary element 640, the inductance and capacitance of first reactive load 502 and third reactive load 703 may be related in approximately a 4:1 ratio. Accordingly, the resonant frequency $RF_2$ may be approximately 4 times the resonant frequency $RF_0$ associated with the first amplifier 350. In some embodiments, the resonant frequency $RF_2$ may be less than 4 times the resonant frequency $RF_0$ due to imperfect coupling, capacitive, inductive, and/or resistive loading of a previous stage, or any other physical circuit effects.

Output signals from first amplifier section 660a and second amplifier section 660b may be coupled together through balun 710. Thus, the output power from two amplifier sections may be summed together to provide a combined output power.

In some embodiments, multi-band amplifier 340 may include additional amplifiers (not shown) and additional secondary elements (not shown) within coupler 630 to provide additional output signals within different frequency bands. For example, a secondary element may be split into $2^n$ segments coupled to $2^n$ amplifier sections to provide a resonant frequency that is $2^n$ times the resonant frequency of a single power amplifier coupled to a single secondary element in a single-ended mode.

Figure 8:
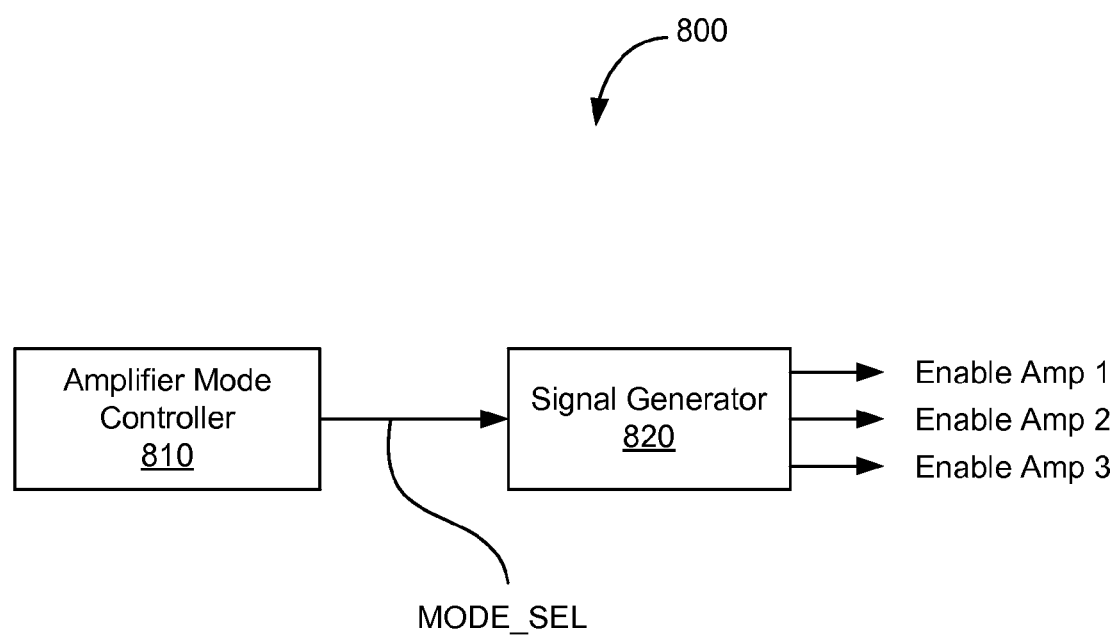
FIG. 8 is a block diagram of an exemplary mode selection module.

FIG. 8 is a block diagram of an exemplary mode selection module 800. Mode selection module 800 may include an amplifier mode controller 810 and a signal generator 820. Amplifier mode controller 810 may generate a MODE_SEL signal to cause the multi-band amplifier 340 to operate in a mode based on a desired frequency band of operation. For example, multi-band amplifier 340 may operate within a first frequency band or a second frequency band. Thus, amplifier mode controller 810 may generate the MODE_SEL signal to operate multi-band amplifier 340 within the first frequency band or the second frequency band. In some embodiments, multi-band amplifier 340 may operate within more than two frequency bands. Accordingly, the amplifier mode controller 810 may generate the MODE_SEL signal to operate multi-band amplifier 340 within more than two frequency bands.

Signal generator 820 may receive the MODE_SEL signal and, in response thereto, may generate enable signals to control amplifiers included in multi-band amplifier 340. In some embodiments, the enable signals may be coupled to amplifiers and may control a power state of the associated amplifier. For example, the enable signal may place the associated amplifier in a power-saving mode or a normal operating mode. In some embodiments, signal generator 820 may generate Enable Amp 1 signal to control first amplifier 350, Enable Amp 2 signal to control second amplifier 355, and Enable Amp 3 signal to control third amplifier 660.

In some embodiments, the enable signal may control switches that may isolate or couple amplifiers included in multi-band amplifier 340 to coupler 330. For example, signal generator 820 may generate Enable Amp 1 to control switch SW1 (see FIGS. 4 and 6), Enable Amp 2 to control switch SW2 and switch SW3 (see FIG. 4), and Enable Amp 3 to control switches SW4-SW7 (see FIG. 6).

A possible relationship between frequency bands, enable signals, amplifiers, and switches is shown below in Table 1.

TABLE 1

| Desired frequency band | Enable Signal | Amplifier Controlled | Switches Controlled |
| --- | --- | --- | --- |
| 1st Frequency band | Enable Amp 1 | First Amplifier | Switches associated with first amplifier |
| 2nd Frequency band | Enable Amp 2 | Second Amplifier | Switches associated with second amplifier |
| 3rd Frequency band | Enable Amp 3 | Third Amplifier | Switches associated with third amplifier |

Figure 9:
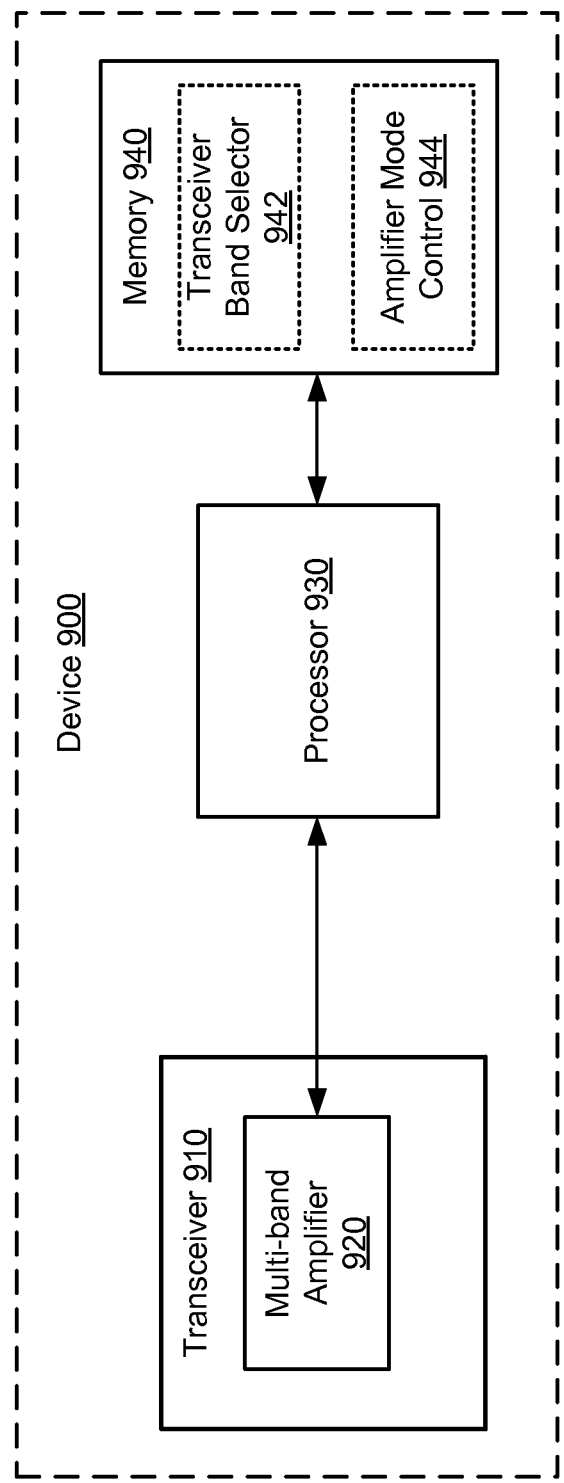
FIG. 9 depicts a device that is another exemplary embodiment of the wireless device of FIG. 1.

FIG. 9 depicts a device 900 that is another exemplary embodiment of wireless device 110 of FIG. 1. Device 900 includes a transceiver 910, a processor 930, and a memory 940. Transceiver 910 may include a multi-band amplifier 920. In some embodiments, multi-band amplifier 920 may be similar to one or more exemplary embodiments of multi-band amplifier 340 described above.

Memory 940 may include a non-transitory computer-readable storage medium (e.g., one or more nonvolatile memory elements, such as EPROM, EEPROM, Flash memory, a hard drive, etc.) that may store the following software modules:

a transceiver band selector module 942 to select a frequency band to operate transceiver 910; and an amplifier mode control module 944 to select an operating mode of multi-band amplifier 920 based on a selected frequency band.

Each software module includes program instructions that, when executed by processor 930, may cause the device 900 to perform the corresponding function(s). Thus, the non-transitory computer-readable storage medium of memory 940 may include instructions for performing all or a portion of the operations of FIG. 10.

Processor 930, which is coupled to transceiver 910, multi-band amplifier 920, and memory 940, may be any suitable processor capable of executing scripts or instructions of one or more software programs stored in device 900 (e.g., within memory 940).

Processor 930 may execute transceiver band selector module 942 to select a frequency band to operate transceiver 910. For example, transceiver band selector module 942 may select a 2.4 GHz frequency band or a 5 GHz frequency band to operate transceiver 910.

Processor 930 may execute amplifier mode control module 944 to select an operating mode for multi-band amplifier 920 based on the selected frequency band. For example, when transceiver band selector module 942 selects to operate in the 2.4 GHz frequency band, then amplifier mode control module 944 may select to operate an amplifier within multi-band amplifier 920 corresponding to the 2.4 GHz frequency band.

Figure 10:
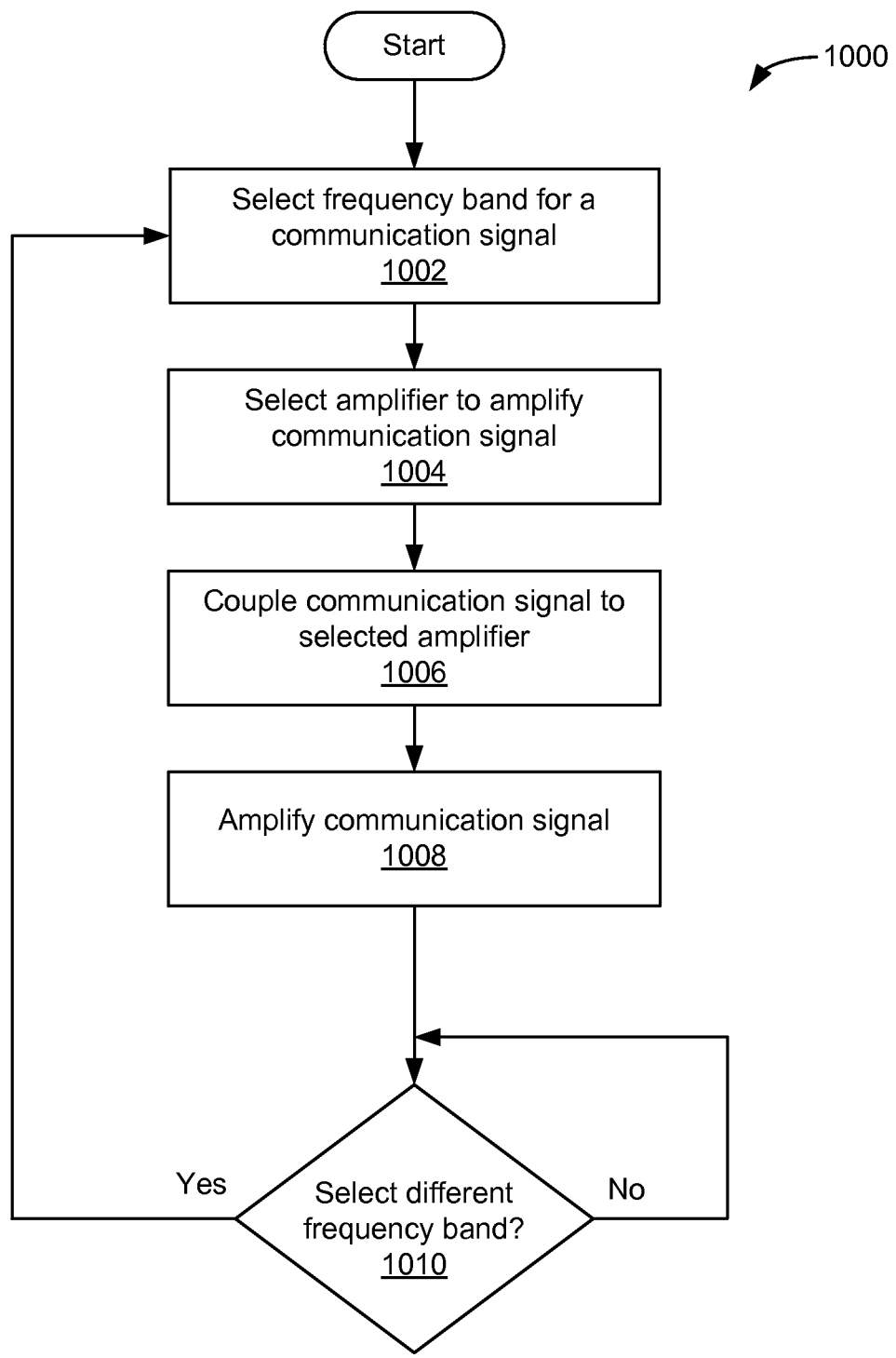
FIG. 10 shows an illustrative flow chart depicting an exemplary operation for operating the multi-band amplifier.

FIG. 10 shows an illustrative flow chart depicting an exemplary operation 1000 for operating multi-band amplifier 340, in accordance with some embodiments. Referring also to FIGS. 3 and 4, a frequency band for a communication signal is selected (1002). In some embodiments, the frequency band may be determined by frequency bands that are available to wireless device 110 and a type of communication signal to be amplified by multi-band amplifier 340. For example, if the communication signal is a Wi-Fi communication signal, then wireless device 110 may select a 2.4 or a 5 GHz frequency band based on proximity of wireless device 110 to 2.4 or 5 GHz wireless resources (e.g., access points). In another example, if the communication signal is a cellular communication signal, then the wireless device 110 may select an available cellular frequency band based on proximity and/or a quality of cellular resources.

Next, an amplifier within multi-band amplifier 340 is selected to amplify the communication signal based on the selected frequency band (1004). As described above, multi-band amplifier 340 may include a plurality of amplifiers to operate within a plurality of frequency bands. Amplifiers included in multi-band amplifier 340 may be designed and/or optimized to operate within a selected frequency band. Thus, an amplifier included in multi-band amplifier 340 may be selected based on the selected frequency band. In one embodiment, selecting the amplifier may include enabling the selected amplifier and/or operating the selected amplifier in the normal operating mode (e.g., leaving the power-saving mode).

Next, the communication signal is coupled to the selected amplifier (1006). In some embodiments, multi-band amplifier 340 may include one or more switches (e.g., switch units, modules, devices, or the like) to couple the selected amplifier to coupler 330. Thus, coupling communication signals to the selected amplifier may include arranging (e.g., opening or closing) one or more switches to couple the communication signal from coupler 330 to the selected amplifier.

Next, the communication signal may be amplified by multi-band amplifier 340 (1008). For example, the communication signal may be received by multi-band amplifier 340, coupled to the selected amplifier, and amplified. In some embodiments, the selected amplifier may be a power amplifier and the communication signal may be transmitted by multi-band amplifier 340.

Next, a selection of a different frequency band for the communication signal is determined (1010). For example, wireless device 110 may detect that a current frequency band is congested and may select a different, less congested frequency band to operate within. If a different frequency band is selected, then operations proceed to 1002 to select a new frequency band. On the other hand, if a different frequency band is not selected, then operations proceed to 1010 to determine, possibly after a predefined time period, if a different frequency band is selected.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A multi-band amplifier, comprising:
a first amplifier;
a second amplifier;
a primary inductive element configured to receive a first communication signal and a second communication signal;
a first secondary inductive element, magnetically coupled to the primary inductive element and including a single-ended output coupled to the first amplifier, the first amplifier and the first secondary inductive element configured to couple the first communication signal within a first frequency band from the primary inductive element to the first amplifier; and
a second secondary inductive element, magnetically coupled to the primary inductive element and including two complementary outputs coupled to the second amplifier, the second amplifier and the second secondary inductive element configured to couple the second communication signal within a second frequency band, different from the first frequency band, from the primary inductive element to the second amplifier.

2. The multi-band amplifier of claim 1, further comprising a mixer including two complementary outputs coupled to the primary inductive element and configured to couple the first communication signal and the second communication signal to the primary inductive element.

3. The multi-band amplifier of claim 1, wherein the first secondary inductive element is a balun.

4. The multi-band amplifier of claim 1, further comprising a balun coupled to an output of the second amplifier.

5. The multi-band amplifier of claim 1, further comprising:
a third secondary inductive element magnetically coupled to the primary inductive element and including two complementary outputs.

6. The multi-band amplifier of claim 5, further comprising:
a third amplifier, wherein the third secondary inductive element is configured to couple the second communication signal from the primary inductive element to the third amplifier.

7. The multi-band amplifier of claim 5, wherein the primary inductive element is further configured to receive a third communication signal.

8. The multi-band amplifier of claim 7, further comprising:
a third amplifier, wherein the third secondary inductive element is configured to couple the third communication signal from the primary inductive element to the third amplifier, and the third communication signal is within a third frequency band different from the first frequency band and the second frequency band.

9. The multi-band amplifier of claim 1, wherein the second frequency band is approximately twice a frequency of the first frequency band.

10. The multi-band amplifier of claim 1, further comprising one or more switch units configured to selectively couple the first amplifier to the first secondary inductive element and to selectively couple the second amplifier to the second secondary inductive element.

11. The multi-band amplifier of claim 10, wherein the one or more switch units are configured based, at least in part, on an operating mode.

12. The multi-band amplifier of claim 1, further comprising a mode controller to generate a mode select signal based, at least in part, on an operating mode of the multi-band amplifier.

13. The multi-band amplifier of claim 12, further comprising a signal generator to generate an amplifier enable signal to control the first amplifier and the second amplifier based, at least in part, on the mode select signal.

14. The multi-band amplifier of claim 1, wherein the second amplifier comprises a first differential amplifier and a second differential amplifier.

15. A method for amplifying communication signals, the method comprising:
receiving a first communication signal and a second communication signal through a primary inductive element;
magnetically coupling a first secondary inductive element to the primary inductive element to couple the first communication signal within a first frequency band to a first amplifier through a single-ended output; and
magnetically coupling a second secondary inductive element to the primary inductive element to couple the second communication signal within a second frequency band, different from the first frequency band, to a second amplifier through two complementary outputs.

16. The method of claim 15, further comprising:
generating, by a mixer, the first communication signal and the second communication signal.

17. The method of claim 15, further comprising:
coupling an output of the second amplifier to a balun.

18. The method of claim 15, further comprising:
coupling the first amplifier to the first secondary inductive element; and
coupling the second amplifier to the second secondary inductive element.

19. A non-transitory computer-readable medium storing instructions that, when executed by one or more processors of a wireless device, cause the wireless device to:
receive a first communication signal and a second communication signal through a primary inductive element;
magnetically couple a first secondary inductive element to the primary inductive element to couple the first communication signal within a first frequency band to a first amplifier through a single-ended output; and
magnetically couple a second secondary inductive element to the primary inductive element to couple the second communication signal within a second frequency band, different from the first frequency band, to a second amplifier through two complementary outputs.

* * * * *